April 25, 1933.    G. A. LUTZ    1,905,478
METHOD OF ELECTRIC WELDING
Filed Dec. 16, 1930    2 Sheets-Sheet 2
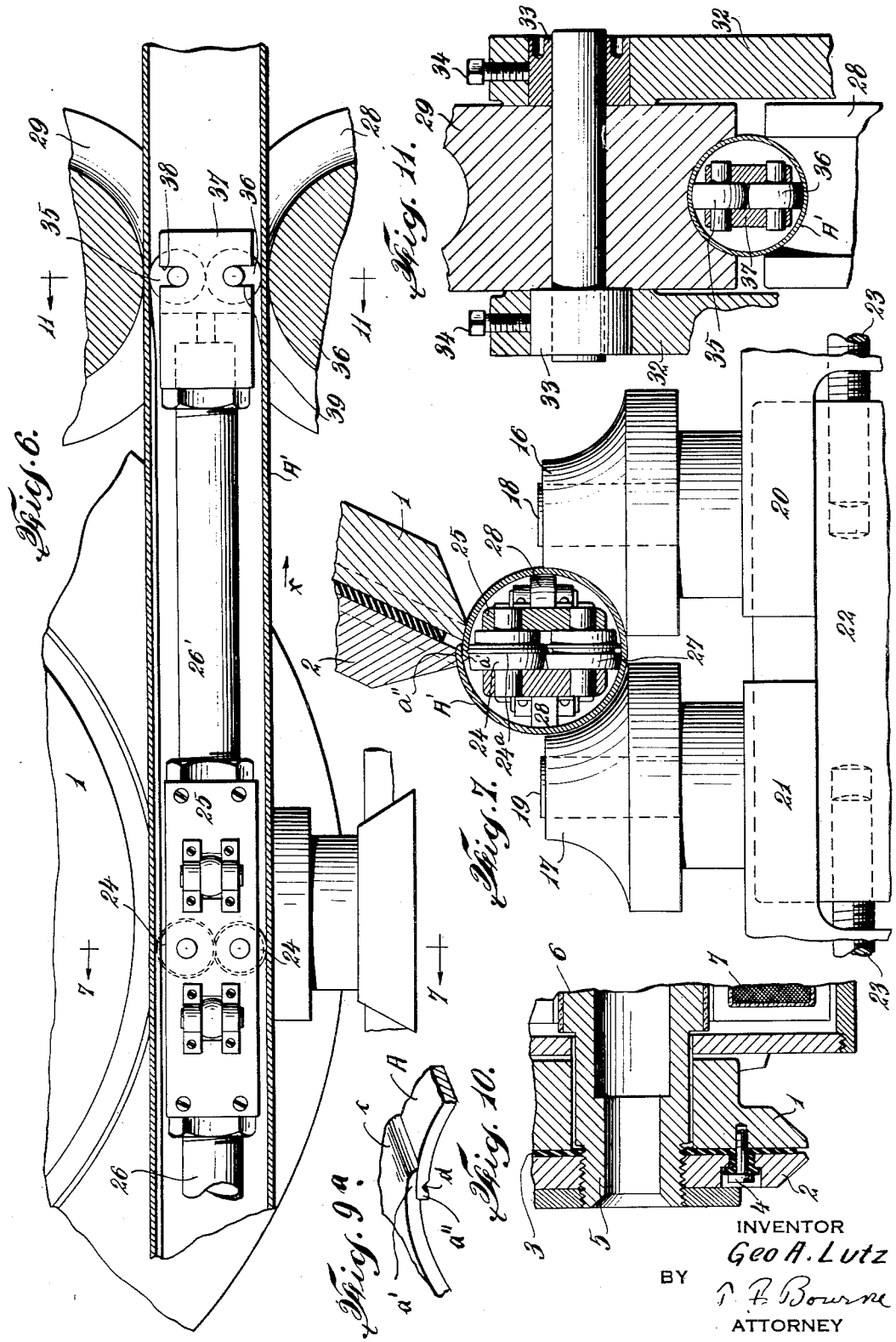
INVENTOR
Geo A. Lutz
BY
T. F. Bourne
ATTORNEY Patented Apr. 25, 1933

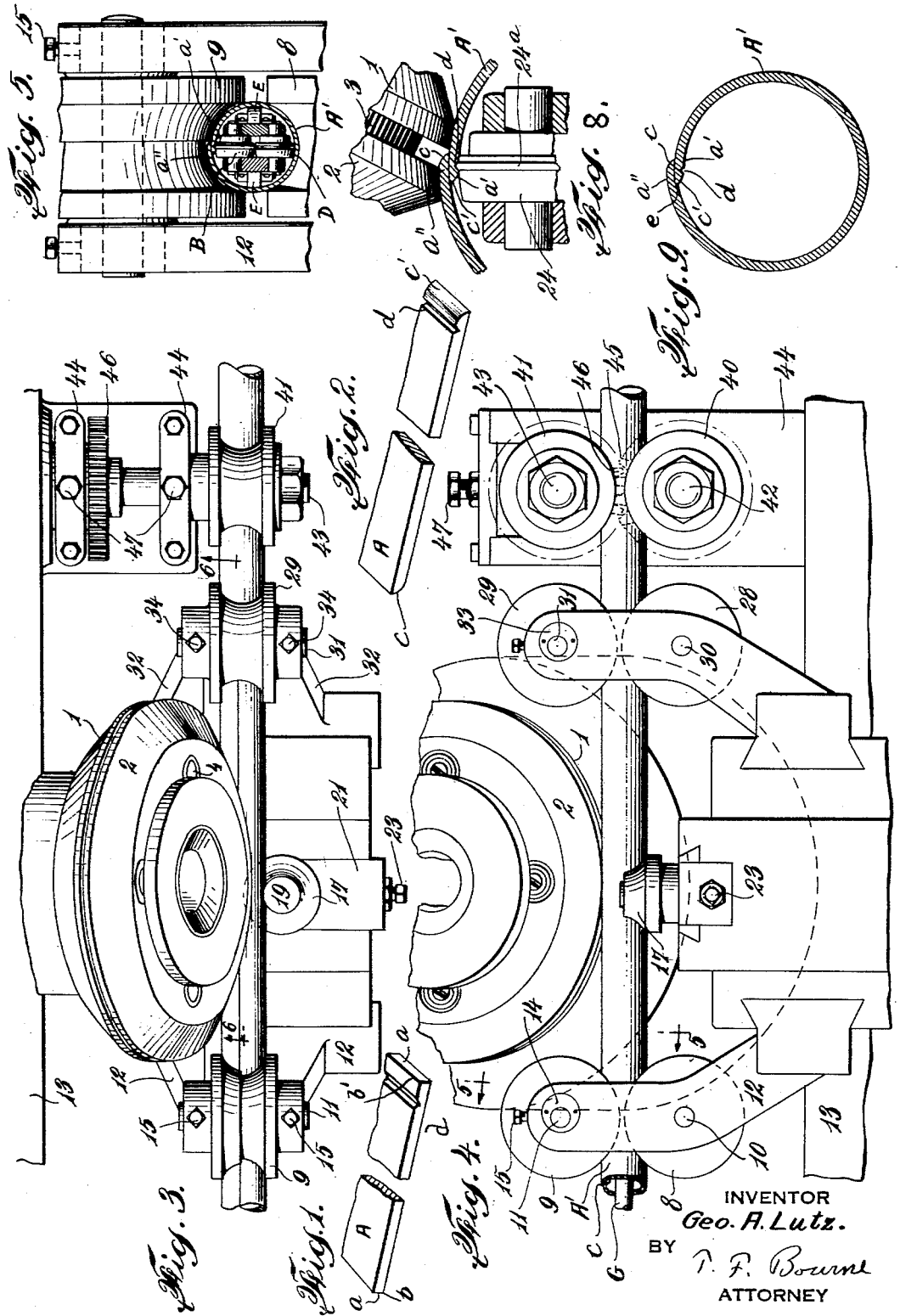

1,905,478

UNITED STATES PATENT OFFICE

GEORGE A. LUTZ, OF CRANFORD, NEW JERSEY, ASSIGNOR TO AMERICAN CIRCULAR LOOM COMPANY, INC., OF DOVER, DELAWARE, A CORPORATION OF DELAWARE

METHOD OF ELECTRIC WELDING

Application filed December 16, 1930. Serial No. 502,660.

My invention relates to welding the overlapped marginal portions of metal parts, and has particular reference to welding the overlapped marginal portions of a tubular metal blank.

When the edges of overlapped metal stock are straight, the corners adjacent to the lapped contacting portions are liable to cool quicker than the body of metal at the lap, with the result that when the heated lapped portions are compressed or ironed together the cooler edge portions do not, in all instances, completely weld with the adjacent portions of the metal blank.

The object of my invention is to so arrange the overlapped portions of a metal blank that all the metal of said portions will be properly heated, so that when the heated portions are compressed or ironed together a uniform welding of the parts will be accomplished.

My invention comprises novel improvements that will be more fully hereafter set forth and then pointed out in the claims.

Reference is to be had to the accompanying drawings, wherein

Fig. 1 is a detail of a piece of metal stock adapted to be used in carrying out my invention;

Fig. 2 is a detail view of said stock prepared for welding;

Fig. 3 is a plan view of an electric welding machine adapted to carry out my invention;

Fig. 4 is a side elevation of Fig. 3;

Fig. 5 is a cross section on line 5, 5 in Fig. 4;

Fig. 6 is an enlarged section on line 6, 6 in Fig. 3;

Fig. 7 is a cross section on line 7, 7 in Fig. 6;

Fig. 8 is an enlarged detail of Fig. 7;

Fig. 9 is a cross section of a welded tube;

Fig. 9a is a similar view of a modification;

Fig. 10 is a detail view of a portion of the transformer and electrodes and;

Fig. 11 is a cross section on line 11, 11 in Fig. 6.

Similar numerals of reference indicate corresponding parts in the several views.

A indicates a piece of metal stock, which may be rolled sheet metal, adapted to be bent into substantially tubular form with its marginal portions $a'$, $a''$ overlapped to be welded together for production of a lap-welded tube. Such stock frequently has its side edges slit straight or at right-angles to the plane of the sheet, as indicated in Fig. 1, so that if such sheet be rolled into tubular form, with the edges overlapped, the extreme corners of the edges at $b$ and $b'$ are liable, after heating for welding, to chill sufficiently to resist or prevent complete union with the adjacent metal of the blank when the heated portions are compressed or ironed together. This usually leaves an unwelded edge producing a groove along the welded portion of the tube. In carrying out my invention I form the surface of the diagonally opposite edge portions of the stock A on a radius or inclined from one surface of the stock to an edge of the opposite surface thereof, as indicated at $c$ and $c'$ in Figs. 2, 8 and 9, as by reducing the sharp edges $b$, $b'$. As shown in Fig. 9a, only one of the edge portions, such as at $c$, may be on a radius or inclined. By the term "inclined" I mean extending in a direction from a surface of the stock other than a right angle. The forming or shaping of the edge portions of the stock A at $c$ and $c'$ may be carried out in any desired way, such as in a mill. After such edge or edges have been shaped, as stated, the stock A is rolled or bent into tubular form with the edge portion $c$ exposed outwardly and its edge portions $a'$ and $a''$ overlapped, as by traversing the stock through a suitable pass between grooved rollers in a known way, or such as set forth in my application filed April 23, 1930, Serial No. 446,463.

The overlapped marginal portions $a'$, $a''$ may be heated for welding in any desired way. I have illustrated spaced electrodes 1 and 2, which may be insulated by insulation at 3. The electrodes illustrated are of the rotary variety united for uniform rotation, as by screws 4 connecting said parts and insulated, such as illustrated in Fig. 10. The electrodes are illustrated as connected with the sides of secondary 5 of a rotary transformer 6 having a primary 7. The transformer referred to may be of any well known type such as set forth in Letters Patent #1,478,262, issued December 18, 1923, to Snodgrass & Hunter. The electrodes and transformer illustrated will rotate together on a common axis in a well known way. At 8 and 9 are grooved guiding rollers providing a pass between them for the tubular blank having the overlapped marginal portions a' and a", as indicated in Fig. 5. Said rollers have shafts 10 and 11 journaled on support 12 carried by main frame 13 of the apparatus. The pressure of the rollers upon the tubular blank A may be adjusted by means of eccentric bearings at 14, adjustable by screws 15 in a known way, or as set forth in my aforesaid application. Adjacent to the electrodes is shown means for guiding the tubular blank as it travels in the direction of the arrow x in Fig. 6. I have illustrated spaced grooved rollers at 16 and 17 shown mounted on pivots 18 and 19, carried by blocks 20 and 21, on a support 22 of the main frame. Said rollers may be adjusted transversely with reference to the blank A by suitable means, such as by screws 23. Within the tubular metal blank is a roller 24, opposed to the electrode 2. Between said roller and the electrode the adjacent portions of the blank travel, with the electrodes in contact with the blank adjacent to the lapped marginal portions a' and a", as indicated in Figs. 7 and 8. The roller 24 is shown journaled in a frame 25 within the tubular blank, which frame may be retained by means of an arm or tube 26 supported in any desired or known way. At 27 is a roller opposed to the roller 24 and journaled upon the frame 25, the roller 27 being adapted to engage the inner surface of the tubular blank at its bottom portion, whereby the rollers 24 and 27 resist the pressure of the electrodes against the blank. The roller 24 is shown provided with a projecting portion 24a that is adapted to enter a longitudinal groove d in the under surface of the lapped portion a' of the tubular blank, for guiding the latter as it travels in contact with the electrodes. Said groove may be formed in the blank A in any desired way. The frame 25 is shown provided with laterally extended rollers 28 that bear against the adjacent sides of the tubular blank, whereby the frame 25 is retained from lateral movement within the blank. In the construction illustrated in Figs. 7 and 8 the electrode 1 contacts with the inset or convolute portion a' of the tubular blank A and the electrode 2 contacts with the outer lapped portion a" of the blank opposite to the roller 24, said roller preferably not engaging the metal of the blank opposite to the electrode 1, whereby desired pressure of the electrodes against the blank may be effected for flow of the current between the electrodes through the lapped portions. The rollers 8 and 9, by suitably compressing the overlapped portions of the tubular blank, provide a definite or fixed thickness of said lapped portions for passage between the electrode 2 and the roller 24, as in the nature of cold rolling. To create such pressure on the lapped portions a', a" of the blank a roller B is shown located within the blank to bear against the inset portion a' (Fig. 5). The roller B is journaled in a frame C within the blank, and a roller D, journaled in said frame, bears against the roller B and against the bottom surface of the blank. Side rollers E journaled in said frame bear against the sides of the blank to retain the frame C from lateral movement. The frame C may be retained in position by an arm or tube G, in any desired way. The welding heat created in the overlapped marginal portions of the blank by the flow of current of suitable amperage from one electrode to the other through the lapped portions will heat the latter for welding said portions.

After the overlapped portions of the tubular blank have been heated to the welding temperature they may be squeezed, compressed or hammered by any suitable means to reduce the overlapped portions such as substantially to the gage of the metal of the blank, so as to produce any desired finish along the weld. For the purpose stated I have illustrated compressing rollers for the overlapped heated portions of the tubular blank, whereby said portions may be compressed or ironed as the tube travels. As illustrated, I provide a throat or pass formed by the grooved rollers 28 and 29 which are shown carried by shafts 30 and 31 that are journaled on uprights 32 on the main frame. By preference the roller 29 is adjustable toward and from the roller 28, for which purpose the shaft 31 is shown eccentrically journaled in sleeves 33 rotatively supported in bearings in the upright 32 and retained in set position by screws 34, (Figs. 3 and 11). The area of the throat or pass between the rollers 28 and 29 may be substantially that of the cross sectional area of the finished welded tube and correspondingly greater than the cross-sectional area of the tubular blank that is lapped, as in Fig. 9, hence greater than the cross-sectional area of the pass between the rollers 8 and 9. Within the welded tube I provide roller means to serve with the roller 29 in compressing, ironing or finally welding down the heated overlapped marginal portions of the tubular blank for a finished tube. At 35 is a roll to engage the inner surface of the tubular blank along the welding line in opposition to the roller 29, and a roll 36 engages the lower surface of the tubular blank in opposition to the roller 28. The distance between the diametrically opposing surfaces of the rollers 35 and 36 may be such that the overlapped marginal portions of the tubular blank will be squeezed so as to reduce them substantially to the gage thickness of the metal blank, (Fig. 11).

The rolls 35 and 36 are shown retained in position and guided by a head or block 37, shown carried by an arm 26', extending from the frame 25 and secured to the said frame and to the head 37 by nuts and threads. The block is shown provided with recesses 38 and 39 receiving pivots of the rolls 35 and 36. Water may be supplied within the tube blank for cooling purposes through the arms 26 and 26' which may be tubular for the purpose.

Tube feeding rollers 40 and 41 are shown spaced from the rollers 28 and 29 and are suitably grooved to receive the welded tube. The rollers 40 and 41 are carried by shafts 42 and 43 journaled in upright 44 on the main frame, (Fig. 4). Said shafts are shown provided with intermeshing gears 45 and 46 for rotating said rollers in the same direction in unison. Either of the said shafts may be driven by suitable power in any desired way. Desired pressure of the grooved rollers 40 and 41 upon the welded tube may be effected as by adjusting the shaft 43 vertically by means of screws 47, (Figs. 3 and 4).

The diagonally disposed edges $c$, $c'$ of the continuous metal strip or sheet A, of any desired width and gage, are first formed to a desired radial or inclined shape, and said strip or sheet is rolled or formed into a tubular blank with the marginal portions $a'$ and $a''$ overlapped to the desired extent, with an inclined edge surface $c$ exposed outwardly. While said portions are in such condition, preferably being first compressed together to a definite thickness, they are heated to a welding temperature under suitable pressure at the lap, to cause said portions to become welded together, as the blank travels longitudinally. Since the edge portions $c$ and $c'$ extend in a direction from one surface of the metal toward the edge along the opposite surface such edge portions will be heated to a desired extent so that when the welded tube passes from the heating place the whole extent of the overlapped portions of the tube will retain the desired temperature. The welded tube referred to will be complete for some uses, such as illustrated in Figs. 9 and 9a, having the advantage of a relatively smooth outer edge portion at $c$, as distinguished from well known lap-welded tubes having sharp edges when made from stock having slit or sheared rectangular edges, as in Fig. 1. When it is desired that the tube have a relatively smooth or substantially uniform circumferential finish or appearance the heated lapped portions $a'$, $a''$ are compressed or ironed down, as illustrated in Fig. 11. As the heated lapped portions of the tube pass from the heating place, or the electrodes, they will remain heated while passing to the compressing means, whereupon as the tube travels between the rollers 28 and 29 the heated overlapped portions $a'$ and $a''$ will be compressed or ironed down to a desired thickness, such as corresponds to the gage of the metal of the blank. By reason of the radial or inclined edge at $c$ such edge will be at such a welding temperature as to be compressed substantially equally with the material of the overlapped portions to form a uniform weld, so as to avoid a relatively cool extreme edge along the weld which might not properly unite with the adjacent metal of the tube because of a difference of temperature. In previous practice in lap-welding, because of sharp corners at $b$, $b'$, a groove has been left along the exterior surface of the weld where undesired corrosion may originate, which groove is avoided in the practice of my invention.

Having now described my invention what I claim is:—

1. The method of lap-welding consisting in making an inclined surface along an edge of a metal blank, forming the blank into tubular shape, overlapping one marginal portion upon the outer surface of the adjacent marginal portion for a distance from the longitudinal edge of the latter with the inclined surface lapping said adjacent marginal portion, and compressing and heating said overlapped portions to a welding temperature.

2. The method of lap-welding consisting in making an inclined surface along an edge of a metal blank, forming the blank into tubular shape with marginal portions of the blank overlapping and said inclined edge surface lapping the adjacent marginal portion at a distance from the longitudinal edge of the latter, compressing said portions together, heating said overlapped portions to a welding temperature, and compressing the heated welded overlapped portions.

3. The method of lap-welding consisting in making an inclined surface on a longitudinal edge of a metal blank, forming the blank into tubular shape with marginal portions overlapped and the inclined surface overlying the tubular blank, compressing and simultaneously heating said overlapped portions to a welding temperature to weld said portions together.

4. The method of lap-welding consisting in making inclined surfaces on the diagonally opposite longitudinal edges of a blank, forming the blank into tubular shape with marginal portions overlapped, and the inclined surfaces respectively within and without the tubular blank, heating said overlapped portions to a welding temperature to weld said portions together, and compressing the heated overlapped portions.

5. The method of lap-welding consisting in making inclined surfaces on the diagonally opposite longitudinal edges of a blank, forming the blank into tubular shape with inner and outer marginal portions of the blank overlapping and the inclined surfaces respectively within and without the tubular blank, compressing said portions together, and heating said compressed overlapped portions to a welding temperature.

6. The method of lap-welding consisting in making inclined surfaces on the diagonally opposite longitudinal edges of a blank, forming the blank into tubular shape with inner and outer marginal portions of the blank overapping and the inclined surfaces respectively within and without the tubular blank, compressing said portions together, heating said overlapped portions to a welding temperature, and reducing the weld by compressing the heated overlapped portions.

7. The method of lap-welding consisting in forming inclined surfaces along the marginal portions of metal stock, lapping the original exterior surfaces of said stock into contact adjacent to said inclined surfaces with the inclined surfaces substantially parallel one to another, heating said inclined lapped portions to a welding temperature, and forcing said original surfaces one against the other while at said welding temperature.

GEORGE A. LUTZ.